Feb. 26, 1957 H. O. PETERSON ET AL 2,783,372

AUTOMATIC GAIN CONTROL SYSTEM

Filed Aug. 1, 1955

INVENTORS
HAROLD O. PETERSON &
ROBERT E. SCHOCK
BY [signature]
ATTORNEY

United States Patent Office 2,783,372

Patented Feb. 26, 1957

2,783,372

AUTOMATIC GAIN CONTROL SYSTEM

Harold O. Peterson and Robert E. Schock, Riverhead, N. Y., assignors to Radio Corporation of America, a corporation of Delaware Application August 1, 1955, Serial No. 525,755

6 Claims. (Cl. 250—20)

This invention relates to automatic gain control (AGC) systems, and more particularly to AGC systems particularly applicable to single sideband (SSB) receivers.

In most SSB receivers (which customarily include separate filters for separating the sideband signal and the carrier signal from each other) the AGC voltage for the receiver is derived from the filtered carrier, which is rectified. However, since the various frequencies of a radio signal spectrum experience diverse fading, it is more logical to derive the AGC voltage from that part of the spectrum which carries the intelligence, namely the sideband. In telephone service, though, when the carrier is unmodulated during "no-talk" periods, there is no sideband energy present, so that in such service the sideband is an unsuitable source of AGC voltage.

An object of this invention is to devise a novel AGC system for overcoming the aforesaid disadvantages, a system wherein the carrier and the sideband are both used as a source of AGC voltage. In this system, the carrier will supply the AGC voltage during "no-talk" periods or intervals of no modulation.

In systems wherein the carrier only is used as an AGC voltage source, it is necessary to use a long time constant in the AGC system, in order that the fading variations of the carrier will not vary the gain of the receiver in such a manner as to modulate the receiver audio output, since the carrier may be experiencing fading which is greatly dissimilar to that experienced by the sideband.

Another object of the invention is to devise an AGC system wherein, with a high degree of effectiveness, a shorter time constant may be used than in prior, conventional systems which use only the carrier as an AGC voltage source.

The objects of this invention are accomplished, briefly, in the following manner: in a SSB receiver, the intermediate frequency (I. F.) output is fed to sideband and carrier filters, which separate the sideband and carrier signals from each other, following which the separated sideband signal is demodulated to derive the modulation frequency components which are then amplified and fed to a rectifier. The filtered carrier is amplified and fed to another rectifier. The output voltages of the two rectifiers are combined to produce a resultant voltage, either by way of separate rectifier loads whose outputs are additively combined or by way of a common rectifier load, and this resultant voltage is utilized as an AGC voltage for the receiver. In a diversity system, each of two SSB receivers has separate sideband and carrier filters, followed by separate rectifiers as before, and all four rectified voltages are combined to produce a resultant voltage which is then utilized as an AGC voltage for both SSB receivers.

The foregoing and other objects of the invention will be better understood from the following description of some exemplifications thereof, reference being had to the accompanying drawings, wherein.

Figure 1:
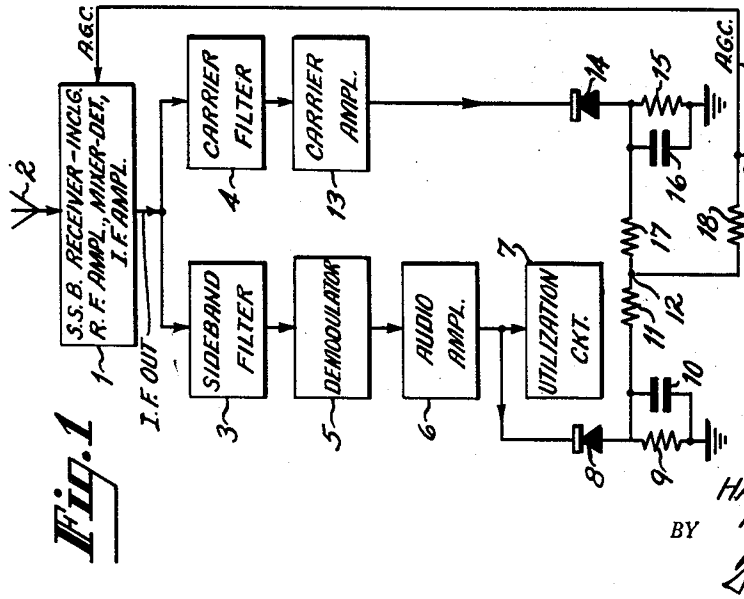
Fig. 1 is a combined block and detailed circuit diagram of one arrangement according to this invention.

Referring first to Fig. 1, a receiver 1 is supplied with an input signal in the radio frequency range by means of a receiving antenna 2 which picks up such signal transmitted from a remote point and supplies it to the receiver input. The receiver 1 is adapted to receive SSB signals, and in practice it may receive a suppressed carrier signal and two separate sideband signals, an upper sideband signal and a lower sideband signal, but such a receiver is ordinarily termed a "single sideband receiver," because each of the two sideband signals carries separate modulation or intelligence. The receiver 1 may, for example, be arranged as illustrated in the copending Schock application, Serial No. 527,587, filed August 10, 1955, and ordinarily includes a radio frequency (R. F.) amplifier, one or more mixer-detectors along with their associated local or heterodyning oscillators, and one or more I. F. amplifiers. If a plurality of I. F. amplifiers are used, they may for example operate at different I. F.'s.

The I. F. output of the SSB receiver 1 is fed jointly to the inputs of a sideband filter 3 and a carrier filter 4. These two filters operate as means to separate the sideband and carrier signals from each other. The sideband signal comprises modulation on the heterodyned I. F. carrier output of receiver 1, so in order to derive the modulation frequency components from this sideband signal, the output of sideband filter 3 is fed to a demodulator 5 which may be of more or less conventional type. This demodulator functions to derive the modulation frequency components from the separated sideband signal output of filter 3. The output of demodulator 5 (modulation frequency or audio frequency components) is amplified in an audio amplifier 6 prior to being fed to a utilization circuit 7 of any type suitable for utilizing the intelligence or modulation frequency components of the sideband signal.

A portion of the output of audio amplifier 6 is fed to the cathode of a rectifier 8. A resistor 9 and a capacitor 10 are connected in parallel between the anode of rectifier 8 and ground, to serve as the elements of a load for the sideband rectifier 8. Rectifier 8 operates to produce across the elements 9 and 10 a unidirectional voltage which is proportional to the average level of the aggregate modulation frequency energy in the received sideband signal, and this voltage is negative with respect to ground. The voltage thus produced or developed across load elements 9 and 10 is fed through an isolating resistor 11 to a junction point 12.

The separated carrier signal (separated from the composite receiver wave by means of the carrier filter 4) is amplified in a carrier amplifier 13 the output of which is in turn fed to the cathode of a rectifier 14. A resistor 15 and a capacitor 16 are connected in parallel between the anode of rectifier 14 and ground, to serve as the elements of a load for the carrier rectifier 14. Rectifier 14 operates to produce across the elements 15 and 16 a unidirectional voltage which is proportional to the average energy level of the received carrier signal, and this voltage is negative with respect to ground. The voltage thus produced or developed across load elements 15 and 16 is fed through an isolating resistor 17 to point 12.

For proper operation, the levels of the amplified signals out of amplifiers 6 and 13 should be so adjusted that the average direct current (D. C.) voltage appearing across the sideband rectifier load elements 9 and 10 is approximately the same as the average D. C. level of the rectified carrier appearing across its rectified load elements 15 and 16. The voltages are fed through the respective resistors 11 and 17 to point 12, in order to combine the produced voltages to produce a resultant voltage at this point. This resultant voltage is used as an AGC voltage for the receiver 1, in a manner to be described more fully hereinafter, so it can be said that the respective produced voltages form a composite AGC voltage supply for the receiver. In other words, the carrier signal and the sideband signal are in effect both used as an AGC source.

The resultant unidirectional AGC voltage produced at point 12 is applied through a smoothing and filtering circuit consisting of a series resistor 18 and a shunt capacitor 19 to the receiver AGC line 20, which is coupled to the receiver 1 to control the gain thereof in the conventional manner. Elements 18 and 19 represent the AGC time constant circuit.

When the unidirectional or D. C. voltage derived from the aggregate of the sideband signal energy (and appearing across elements 9 and 10) falls below the level of the D. C. derived from the rectified carrier (and appearing across elements 15 and 16), due to diverse fading, the receiver AGC voltage is supplied by the rectified carrier, since the carrier rectifier load 15, 16 is connected to AGC point 12. Likewise, when the sideband signal disappears during "no-talk" periods in telephone service, due to the absence of modulation at the transmitter, the rectified carrier maintains an AGC voltage at the receiver.

At other times, the receiver AGC voltage is derived from the rectified sideband signal components, these being the parts of the composite received signal which carry the intelligence.

In systems where the carrier signal only is used as an AGC source, it is usually necessary to use a long time constant circuit on the AGC line, in order that the fading variations of the carrier will not vary the gain on the receiver in such a manner as to modulate the receiver audio output, since the carrier may be experiencing fading which is greatly dissimilar to that experienced by the sideband. However, when the AGC voltage is derived from both carrier signal and sideband signal, as in the present invention, it is usually possible to use a shorter time constant circuit at 18, 19, and thus further reduce the more rapid fading variations of the receiver output signal.

Figure 2:
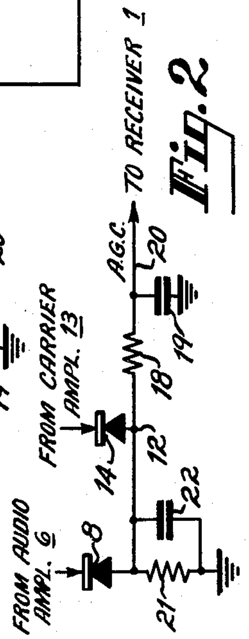
Fig. 2 is a partial circuit diagram of a modified arrangement.

Now referring to Fig. 2, which illustrates a modified scheme, the arrangement is the same as in Fig. 1, up to and including the sideband and carrier rectifiers 8 and 14, respectively. In Fig. 2, instead of separate rectifier loads and isolating resistors to effect the combination of the two produced voltages, a common rectifier load is utilized, without the isolating resistors. A common rectifier load, comprising a resistor 21 and a capacitor 22 connected in parallel, is connected from the anodes of both rectifiers 8 and 14 to ground, and in this case the anodes of both rectifiers are also connected directly to AGC point 12, and thence via the network 18, 19 to the AGC line 20. In Fig. 2, the two voltages produced by the sideband and carrier rectifiers 8 and 14, respectively, are combined in a common rectifier load 21, 22 to produce a resultant voltage at point 12, which voltage is used as an AGC voltage for receiver 1. In other words, in Fig. 2 the sideband and carrier signals are rectified across a common rectifier load 21, 22, and the resultant AGC voltage produced across this rectifier load is fed to the SSB receiver by way of the time-constant circuit elements 18 and 19 and AGC line 20.

Figure 3:
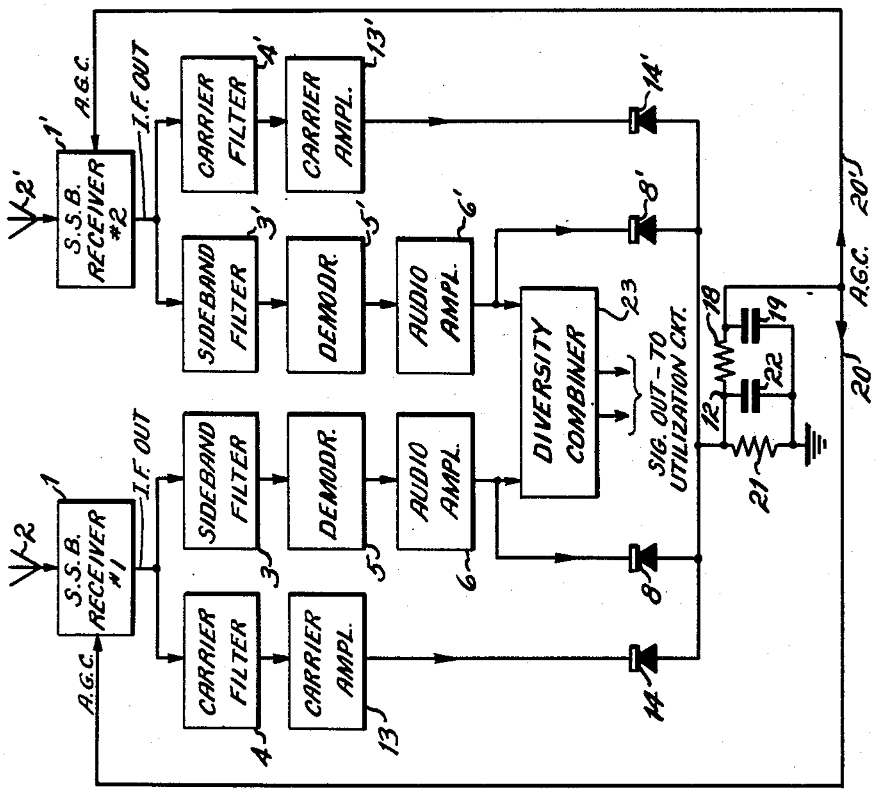
Fig. 3 is a diagrammatic representation of a diversity receiving system utilizing the arrangement of Fig. 2.

In Fig. 3, the circuit arrangement of Fig. 2, with a common rectifier load, is used in a two-receiver diversity system. Referring to Fig. 3, two SSB receivers 1 and 1′ have their respective pickup antennas 2 and 2′ arranged in space or polarization diversity with respect to a remote transmitter. Each of these two SSB receivers is preferably quite like the single receiver of Fig. 1, and each produces an I. F. signal at its output.

The I. F. signal out of receiver 1 is fed to sideband and carrier filters 3 and 4, respectively, whereby the carrier and sideband signals are separated from each other. The separated sideband signal out of filter 3 is then demodulated in demodulator 5 and the resulting audio frequency wave is amplified in amplifier 6 and then a portion of it is fed to the cathode of sideband rectifier 8. The separated carrier signal out of filter 4 is amplified in carrier amplifier 13 and then fed to the cathode of carrier rectifier 14.

Similarly, the I. F. signal out of receiver 1′ is fed to sideband and carrier filters 3′ and 4′, respectively, whereby the carrier and sideband signals are separated from each other. The separated sideband signal out of filter 3′ is then demodulated in demodulator 5′ and the resulting audio frequency wave is amplified in amplifier 6′ and then a portion of it is fed to the cathode of sideband rectifier 8′. The separated carrier signal out of filter 4′ is amplified in carrier amplifier 13′ and then fed to the cathode of carrier rectifier 14′.

All of the rectifiers 8, 8′, 14 and 14′ have a common rectifier load circuit comprising a resistor 21 and a capacitor 22 connected in parallel, this circuit being connected from the anodes of all the rectifiers to ground. In Fig. 3, the separated carrier signal in each receiver has its own rectifier (14 and 14′), and the separated sideband signal in each receiver has its own rectifier (8 and 8′). All four of the produced voltages from these rectifiers are combined in the common rectifier load 21, 22 to produce a resultant voltage at AGC point 12. This resultant AGC voltage generated or produced across the rectifier load circuit 21, 22 is fed to both SSB receivers 1 and 1′ by way of the time-constant circuit elements 18 and 19 and AGC lines 20 and 20′, respectively. The resultant voltage across circuit 21, 22 is thus used as an AGC voltage for both receivers 1 and 1′.

In Fig. 3, the filtered (separated) carrier energy and also the separated sideband energy from each of the two receivers are rectified for AGC use, and the previously-described advantages of using both carrier and sideband signals for AGC purposes are again realized.

In Fig. 3, the remaining portions of the outputs of audio amplifiers 6 and 6′, which are diversified and amplified modulation frequency or audio frequency components, are applied to a diversity combiner 23, in which selection or suitable combination of the diversified signals takes place. Combiner 23 may be of any more or less conventional design. The signal output of diversity combiner 23 is fed to a suitable utilization circuit (not shown), for utilization of the intelligence or modulation frequency components of the sideband signal.

What is claimed is:

1. In a diversity system having first and second receivers each receptive of a composite wave containing both a sideband signal and a carrier signal, means in said first receiver for separating the sideband and carrier signals in such receiver from each other, means in said first receiver for rectifying the separated sideband signal in such receiver to produce a voltage proportional to the average level of the modulation frequency energy in said sideband signal, means in said first receiver for rectifying the separated carrier signal in such receiver to produce a voltage proportional to the average energy level of said carrier signal, means in said second receiver for separating the sideband and carrier signals in such receiver from each other, means in said second receiver for rectifying the separated sideband signal in such receiver to produce a voltage proportional to the average level of the modulation frequency energy in said sideband signal, means in said second receiver for rectifying the separated carrier signal in such receiver to produce a voltage proportional to the average energy level of said carrier signal, means for combining all of said voltages produced by rectification to produce a resultant voltage, and means for utilizing said resultant voltage as an automatic gain control voltage for both said first and said second receivers.

2. In a diversity system having first and second receivers each receptive of a composite wave containing both a sideband signal and a carrier signal, means in said first receiver for separating the sideband and carrier signals in such receiver from each other, means in said first receiver for rectifying the separated sideband signal in such receiver to produce a voltage proportional to the average level of the modulation frequency energy in said sideband signal, means in said first receiver for rectifying the separated carrier signal in such receiver to produce a voltage proportional to the average energy level of said carrier signal, means in said second receiver for separating the sideband and carrier signals in such receiver from each other, means in said second receiver for rectifying the separated sideband signal in such receiver to produce a voltage proportional to the average level of the modulation frequency energy in said sideband signal, means in said second receiver for rectifying the separated carrier signal in such receiver to produce a voltage proportional to the average energy level of said carrier signal, means fo combining all of said voltages produced by rectification in a common rectifier load to produce a resultant voltage, and means for utilizing said resultant voltage as an automatic gain control voltage for both said first and said second receivers.

3. In a diversity system having first and second receivers each receptive of a composite wave containing both a sideband signal and a carrier signal, means in said first receiver for separating the sideband and carrier signals in such receiver from each other, means in said first receiver for demodulating the separated sideband signal in such receiver to derive the modulation frequency components therefrom, means in said first receiver for rectifying the modulation frequency components in such receiver to produce a voltage proportional to the average level of the modulation frequency energy in such receiver, means in said first receiver for rectifying the separated carrier signal in such receiver to produce a voltage proportional to the average energy level of said carrier signal, means in said second receiver for separating the sideband and carrier signals in such receiver from each other, means in said second receiver for demodulating the separated sideband signal in such receiver to derive the modulation frequency components therefrom, means in said second receiver for rectifying the modulation frequency components in such receiver to produce a voltage proportional to the average level of the modulation frequency energy in such receiver, means in said second receiver for rectifying the separated carrier signal in such receiver to produce a voltage proportional to the average energy level of said carrier signal, means for combining all of said voltages produced by rectification to produce a resultant voltage, and means for utilizing said resultant voltage as an automatic gain control voltage for both said first and said second receivers.

4. In a diversity system having first and second receivers each receptive of a composite wave containing both a sideband signal and a carrier signal, means in said first receiver for separating the sideband and carrier signals in such receiver from each other, means in said first receiver for rectifying the separated sideband signal in such receiver to produce a voltage proportional to the average level of the modulation frequency energy in said sideband signal, means in said first receiver for rectifying the separated carrier signal in such receiver to produce a voltage proportional to the average energy level of said carrier signal, means in said second receiver for separating the sideband and carrier signals in such receiver from each other, means in said second receiver for rectifying the separated carrier signal in such receiver to produce a voltage proportional to the average energy level of said carrier signal, means for combining all of said voltages produced by rectification to produce a resultant voltage, and means for utilizing said resultant voltage as an automatic gain control voltage for both said first and said second receivers.

5. In a diversity system having first and second receivers each receptive of a composite wave containing both a sideband signal and a carrier signal, means in said first receiver for separating the sideband and carrier signals in such receiver from each other, means in said first receiver for rectifying the separated sideband signal in such receiver to produce a voltage proportional to the average level of the modulation frequency energy in said sideband signal, means in said first receiver for rectifying the separated carrier signal in such receiver to produce a voltage proportional to the average energy level of said carrier signal, means in said second receiver for separating the sideband and carrier signals in such receiver from each other, means in said second receiver for rectifying the separated sideband signal in such receiver to produce a voltage proportional to the average level of the modulation frequency energy in said sideband signal, means for combining all of said voltages produced by rectification to produce a resultant voltage, and means for utilizing said resultant voltage as an automatic gain control voltage for both said first and said second receivers.

6. In a receiver receptive of a composite wave containing both a sideband signal and a carrier signal which together represent the intelligence being transmitted, means for separating the sideband and carrier signals from each other, means for rectifying the separated sideband signal across a rectifier load, means for rectifying the separated carrier signal across the same rectifier load, thereby to produce a resultant voltage which is a combination of the rectified carrier and sideband voltages across the common rectifier load, and means for utilizing said resultant voltage as an automatic gain control voltage for said receiver.

References Cited in the file of this patent

UNITED STATES PATENTS

| | | |
|---|---|---|
| 2,226,366 | Braden | Dec. 24, 1940 |
| 2,273,023 | Bellescize | Feb. 17, 1942 |
| 2,400,073 | Cawein | May 14, 1946 |
| 2,491,918 | Boer et al. | Dec. 20, 1949 |
| 2,552,527 | Dean et al. | May 15, 1951 |